United States Patent Office 3,505,320
Patented Apr. 7, 1970

3,505,320
5-NITROTHIAZOLE DERIVATIVES AND THEIR PRODUCTION
Erich Dabritz and Heinz Herlinger, Leverkusen, and Marianne Bock, Wuppertal-Elberfeld, Germany, assignors to Farbenfabriken Bayer Aktiengesellschaft, Leverkusen, Germany
No Drawing. Filed Jan. 15, 1968, Ser. No. 697,602
Claims priority, application Germany, Jan. 24, 1967, F 51,329
Int. Cl. C07d 91/34, 93/10
U.S. Cl. 260—243      11 Claims

ABSTRACT OF THE DISCLOSURE 5-nitrothiazole derivatives of the formula:

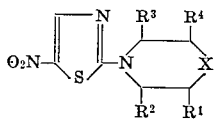

wherein X is oxygen or $SO_2$ and $R^1$ to $R^4$ are hydrogen, substituted or unsubstituted aliphatic, aralkyl or aryl moieties, or $R^1$ together with $R^2$ and $R^3$ together with $R^4$ are constituents of a carbocyclic 6-membered ring system, are prepared by reacting compounds of the formula:

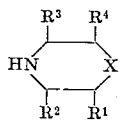

wherein X and $R^1$ to $R^4$ are as defined above, either with (a) 2-substituted 5-nitrothiazoles of the formula:

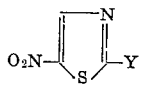

wherein Y is halogen, i.e., fluorine, chlorine, bromine or iodine, or the group $SO_2$—$CH_3$, or (b) in succession with cyanogen chloride, hydrogen sulphide, monochloro-acetaldehyde semihydrate, and finally with a nitrating agent. The 5-nitrothiazole derivatives are useful in the treatment of parasitic infections.

---

The present invention is concerned with 5-nitrothiazole derivatives and their production. More particularly, the 5-nitrothiazole derivatives have the general formula:

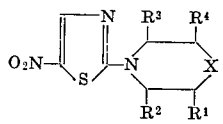

wherein X is oxygen or $SO_2$ and $R^1$ to $R^4$ are hydrogen, substituted or unsubstituted aliphatic, aralkyl or aryl moieties, or $R^1$ together with $R^2$ and $R^3$ together with $R^4$ are constituents of a carbocyclic 6-membered ring system. The 5-nitrothiazole derivatives are produced by reacting compounds of the formula:

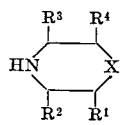

wherein X and $R^1$ to $R^4$ are as defined above, either with (a) 2-substituted 5-nitrothiazoles of the formula:

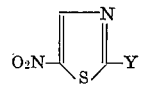

wherein Y is halogen, i.e., fluorine, chlorine, bromine or iodine, or the group $SO_2$—$CH_3$ or, (b) in succession with cyanogen chloride, hydrogen sulphide, monochloro-acetaldehyde semihydrate, and finally with a nitrating agent. Nitric acid is the preferred nitrating agent. The hydrocarbon moiety set forth above contain a double or a triple bond.

The substituted aliphatic moieties include, in particular, straight and branched chain alkyl moieties of 1 to 4 carbon atoms wherein the aliphatic moiety may also contain a double bond and where, in general, the total number of carbon atoms in $R^1$ to $R^4$ does not exceed 8.

When $R^1$ to $R^4$ are substituted aliphatic, aralkyl or aryl moieties, the substituents may be alkoxy of 1 to 4 carbon atoms, cycloalkyloxy, such as cyclohexyloxy wherein the cyclohexyl moiety may also contain a double bond, $O$—$(CH_2)_2$—$O$-alkyl of 1 to 4 carbon atoms in the alkyl moiety, O-alkenyl, in particular, O-allyl, substituted or unsubstituted phenoxy moieties: the preferred substituents in the case of substituted phenoxy moieties are halogen, alkyl of 1 to 3 carbon atoms, $NO_2$ and CN, dialkylamino of 1 to 4 carbon atoms in the alkyl moiety, dialkylamino-N-oxides of 1 to 4 carbon atoms in the alkyl moiety, and where in the case of dialkylamino or dialkylamino-N-oxides, the alkyl groups may also be constituents of a heterocyclic ring system which may contain oxygen, N-alkyl of 1 to 4 carbon atoms, S, SO or $SO_2$ as further hetero-atoms or groups. Further substituents in the case of substituted aliphatic, aralkyl or aryl moieties include substituted and unsubstituted N-alkyl-anilines of 1 to 4 carbon atoms in the alkyl moiety: in the case of substituted moieties, the preferred substituents are halogens, $NO_2$, alkyl of 1 to 4 carbon atoms and alkoxy of 1 to 4 carbon atoms. Further substituents include —$SO_2$-alkyl of 1 to 4 carbon atoms and —$SO_2$-phenyl or —$SO_2$-substituted phenyl wherein the substituent is halogen alkyl of 1 to 4 carbon atoms or $NO_2$.

Further examples of the substituted aliphatic moieties include araliphatic moieties, such as cycloaliphatic moieties with 5 to 8 carbon atoms in the ring system. Six carbon atoms is the preferred number. The ring system may also contain a double bond.

The araliphatic radicals preferably contain an aromatic hydrocarbon, such as phenyl, and have 1 to 4 and preferably 1 or 2 carbon atoms in the aliphatic chain.

The cycloaliphatic, araliphatic and aromatic radicals are unsubstituted or substituted by lower alkyl and lower alkoxy, carbalkoxy, $NO_2$, COOH, $SO_3H$ or halogen, preferably fluorine, chlorine or bromine.

These compounds, according to the present invention, are useful in the treatment of parasitic infections, especially pathogenic protozoa and also useful in the treatment of parasitic worms. The effect of the present invention on *Entamoeba histolytica* which causes tropical dysentery and on *Trichomonas vaginalis* is superior to that of any known chemically related therapeutic compounds.

The compounds according to the invention destroy the organisms causing *Entamoeba histolytica*, *Trichomonas vaginalis* and lambliae infections. Besides, they can be used in the oral treatment of the aforesaid infections of human beings by administration in form of tablets, sugar-coated pills, capsules or as juice, optionally also in solution or suspension for parenteral injection. The therapeutical dosage for human beings amounts to approximately 2.5–30 mg./kg. per day for about 10 days. The dosage can be increased if the compatibility, which varies individually, is good.

The two reaction sequences according to the invention are illustrated by the following reaction equation:

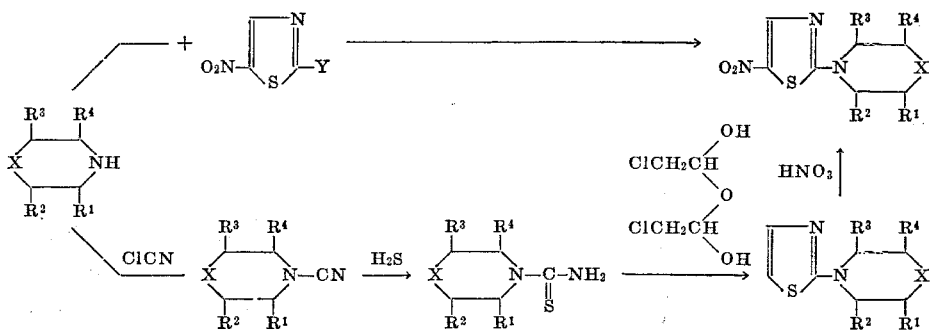

It is already known that compounds containing the group NH can be reacted with 2-substituted nitrothiazoles, for example, with 2-bromo-5-nitrothiazole [P. Schmidt and M. Wilhelm, Angewandte Chemie 78 (1966), page 850]. However, the reaction leads to final products which vary in accordance with the type of secondary amine to be reacted. According to the following reaction equation:

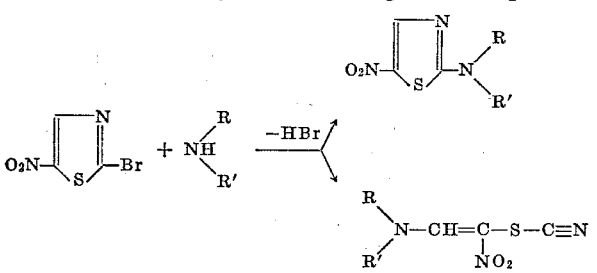

the reaction can either lead to the 2-substituted nitrothiazole, or the attack of the secondary base takes place in the 4-position of the 2-bromo-5-nitrothiazole in which case the unsaturated nitrothiocyanate is formed with the release of a carbon-nitrogen bond. It has been found in this context that sterically hindered bases give a substantially higher yield of decyclized product than simple secondary amines. Thus, for example, dicyclohexylamine practically only yielded the corresponding thiocyanate, whereas dimethylamine only yielded 2-dimethylamino-5-nitrothiazole.

According to these results, it was not to be expected that strongly space-filling heterocyclic bases would react with 2-substituted 5-nitrothiazoles without opening of the thiazole ring to form the corresponding 5-nitrothiazoles heterocyclic-substituted in the 2-position.

It must, therefore, be called surprising that the 5-nitrothiazole derivatives, according to the invention, are obtained in a smooth reaction and with good yields by reacting the aforesaid heterocyclic bases in an inert organic solvent, optionally in the presence of a tertiary organic base, at temperatures of −50 to +300° C., preferably at +20 to 150° C., under pressures of 1 to 100 atm., preferably under normal pressure, with 2-substituted 5-nitrothiazoles.

The following heterocyclic bases are used, for example:

tetrahydro-1,4-thiazine-dioxide
3-methyl-tetrahydro-1,4-thiazine-dioxide
2-methyl-tetrahydro-1,4-thiazine-dioxide
3-ethyl-tetrahydro-1,4-thiazine-dioxide
2,3-dimethyl-tetrahydro-1,4-thiazine-dioxide
3-n-propyl-tetrahydro-1,4-thiazine-dioxide
3-n-butyl-tetrahydro-1,4-thiazine-dioxide
3-phenyl-tetrahydro-1,4-thiazine-dioxide
3-cyclohexyl-tetrahydro-1,4-thiazine-dioxide
3,5-dimethyl-tetrahydro-1,4-thiazine-dioxide
2,5-dimethyl-tetrahydro-1,4-thiazine-dioxide
2,3,5-trimethyl-tetrahydro-1,4-thiazine-dioxide
2,3,6-trimethyl-tetrahydro-1,4-thiazine-dioxide
2,3,5,6-tetramethyl-tetrahydro-1,4-thiazine-dioxide
2,3-tetramethylene-tetrahydro-1,4-thiazine-dioxide
2,3,5,6-bis-tetramethylene-tetrahydro-1,4-thiazine-dioxide
3-methoxy-methyl-tetrahydro-1,4-thiazine-dioxide
3-ethoxy-methyl-tetrahydro-1,4-thiazine-dioxide
3-n-propoxy-methyl-tetrahydro-1,4-thiazine-dioxide
3-n-butoxy-methyl-tetrahydro-1,4-thiazine-dioxide
3-allyloxy-methyl-tetrahydro-1,4-thiazine-dioxide
3-(2-methoxy-ethoxy)-methyl-tetrahydro-1,4-thiazine-dioxide
3-phenoxy-methyl-tetrahydro-1,4-thiazine-dioxide
3-methoxy-methyl-5-methyl-tetrahydro-1,4-thiazine-dioxide
3,5-bis-(methoxy-methyl)-tetrahydro-1,4-thiazine-dioxide
3-(methylsulphonyl-methyl)-tetrahydro-1,4-thiazine-dioxide
3-(n-butylsulphonyl-methyl)-tetrahydro-1,4-thiazine-dioxide
3-(N-methylanilino-methyl)-tetrahydro-1,4-thiazine-dioxide and morpholine.

The following compounds are used as 2-substituted 5-nitrothiazoles, for example:

2-fluoro-5-nitrothiazole
2-chloro-5-nitrothiazole
2-bromo-5-nitrothiazole
2-iodo-5-nitrothiazole, and
2-methylsulphonyl-5-nitrothiazole.

Examples of inert organic solvents are: hydrocarbons, such as light petrol, white spirits, hexane, cyclohexane, benzene, toluene, xylene; ethers, such as diisopropyl ether, dioxane, tetrahydrofuran; chlorinated hydrocarbons, such as methylene chloride, ethylene chloride, chloroform, carbon tetrachloride, chlorobenzene; or ketones, such as acetone, methyl ethyl ketone, methyl butyl ketone or cyclohexanone.

The tertiary organic bases include triethylamine, pyridine, alkyl-pyridines, quinoline, N,N-dimethyl-aniline and N,N-dimethyl-benzylamine.

To carry out the process, the 2-substituted 5-nitrobenzene is generally either dissolved in an organic solvent and added dropwise to the preferably equimolar amount of the heterocyclic base which is dissolved in the same or in another organic solvent, or it is introduced in solid form.

If desired, the heterocyclic base is admixed, for neutralization of the hydrogen halide which may be liberated, with at least the stoichiometric amount of an organic base, unless the heterocyclic base to be reacted is used in excess as acid acceptor.

The reaction temperature amounts to about −50 to 300° C., preferably 20 to 150° C. In general, the reaction requires 1 to 24 hours, preferably 2 to 8 hours. A particular embodiment of the process according to the invention consists in carrying out the reaction in an aqueous solution in the presence of 0.05 to 1 percent by weight of an emulsifier, such as oleyl-alcohol polyglycol ether, 3-benzyl-4-hydroxy-biphenyl polyglycol ether di-sec.-butyl-naphthalene-sulphonate or dinaphthyl-methane-sulphonate. Working up is performed in the usual manner, usually by precipitating the 5-nitrothiazole derivative with water, whereby the hydrogen halide of the organic base possibly added as hydrogen halide acceptor is dissolved.

With regard to the second reaction path for producing 5-nitrothiazole derivatives according to the invention, the formulated process steps are also known in part.

The first step, the reaction of the heterocyclic bases with cyanogen chloride under reaction conditions as are described in Houben-Weyl, volume 8, page 173, for the reaction between compounds containing the NH-group and cyanogen halide in general, leads to hitherto unknown cyanamides which are colorless crystallized substances, hitherto unknown for $X=SO_2$ (cf. reaction equation in column 3).

The subsequent addition of hydrogen sulphide on to these cyanamides in the presence of ammonia, is carried out as described by O. Wallach, Ber. Dtsch. Chem. Ges. 32 (1899), page 1872, for dialkyl-cyanamides. Suitable solvents, besides those mentioned above by way of example, are water or alcohols, such as methanol, ethanol, isopropanol, n-propanol, n-butanol and dimethyl formamide. The reaction temperature amounts to about 20 to 200° C., preferably 60 to 100° C., under normal pressure. Obviously the reaction can also be carried out in an autoclave under $H_2S$- or $NH_3$-pressure, in order to shorten the reaction time. The resultant thiocarboxamides are colorless, crystallized compounds, hitherto unknown in the case of $X=SO_2$ (cf. formulae in column 3).

The subsequent step is concerned with the cyclization of these thiocarboxamides by means of monochloro-acetaldehyde semi-hydrate. Such a cyclization with chloroacetaldehyde semihydrate has been described, for example, for N,N-di-n-propyl-thiourea [A. Bouzom and J. Metzger, Bull. Soc. Chim. France (1963), page 2582], where 2-di-n-propyl-aminothiazole was obtained in a yield of 39%. The corresponding cyclization reaction by means of mono-chloro-acetaldehyde semihydrate has not yet been disclosed for the thiocarboxamides obtained in the present case.

The process consists in that crystalline monochloroacetaldehyde semihydrate is reacted with the heterocyclic thiocarboxamides in an inert organic solvent at about 0 to about 200° C., preferably at 50 to 100° C., and that the hydrochlorides of the cyclization products, which crystallize from the hydrochloric acid reaction solution upon cooling, are converted in the usual manner into the free bases which are obtained in a smooth reation and with surprisingly good yields.

The monochloro-acetaldehyde is preferably used in the form of a solution in an inert organic solvent which is a suitable reaction medium, for example, as a 50 to 75% solution, but it can also be used in crystalline form.

As reaction medium, there serve inert organic solvents which should have a certain dissolving capacity for monochloro-acetaldehydes. Suitable are, for example, ketones, such as aceton, methyl ethyl ketone, diethyl ketone, cyclohexanone, methyl propyl ketone, di-n-propyl ketone, methyl isopropyl ketone; esters, such as methyl acetate, ethyl acetate or isopropyl acetate; ethers, such as diethyl ether, diisopropyl ether, dioxane or tetrahydrofuran; and nitriles, such as acetonitrile or propionitrile.

The reaction components are generally used in equimolar amounts. However, it is also possible, of course, to work with an excess of one of the components of up to about 30%. The reaction time is generally about 1 to 24 hours, preferably 1 to 12 hours.

The diazole derivatives so obtained are colorless crystallized substances of hitherto unknown constitution.

In the last step, these compounds are subjected to nitration. The nitration of 2-aminothiazoles which are aliphatic-disubstituted on the amino nitrogen, to form 2-di-alkylamino-5-nitrothiazoles has been described by E. Waletzky in U.S. Patent No. 2,547,677, where the reaction is carried out in known manner with fuming nitric acid density 1.5, in concentrated sulphuric acid as reaction medium at 15 to 40° C.

It has now been found that also the heterocyclic-substituted thiazoles here obtained can be nitrated under these sharp reaction conditions, without ring opening, decomposition by hydrolysis or any other side reaction, in a smooth reaction with yields of up to 96% of theory.

To carry out the process, the 2-substituted thiazole is introduced, with cooling, into the 2- to 20-fold molar, preferably 10-fold molar, amount of sulphuric acid (60 to 100%, preferably 96% $H_2SO_4$), and the resultant sulphuric acid solution is subsequently admixed dropwise with the equimolar amount of nitric acid, preferably concentrated $HNO_3$ of density 1.4–1.5, while a reaction temperature below 70° C., preferably below 30° C., is maintained, if necessary, by external cooling.

Obviously, it is also possible to work with an excess of nitric acid of up to about 30%. It is further possible to use a commercial nitrating acid with a content of about 25 to about 40% $HNO_3$ (remainder $H_2SO_4$) or also a mixture of alkali metal nitrate (Na, K) and sulphuric acid. Besides nitric acid, other nitrating agents can be used, for example, anhydrous nitric acid in chlorinated hydrocarbons, such as carbon tetrachloride or chloroform, and also acetyl nitrate, benzoyl nitrate, inorganic nitrates, such as copper nitrate or iron (III) nitrate, in the presence of acetic acid anhydride.

Working up of the nitrated reaction solution is carried out in known manner by pouring it into water or on to ice and, if desired, subsequent neutralization of the acidic solution with bases. The nitration product then crystallizes and is isolated in the usual manner.

Table I shows the effectiveness of compounds of the present invention against *Entamoeba histolytica* and *Trichomonas vaginalis* per os and subcutaneous administration respectively in varying dosage levels in rats, golden hamsters and mice and also includes a comparison with one of the best prior art compounds, namely Belgian Patent No. 632,989, Example 1.

The test for *E. histolytica* is carried out on the intestinal infection of rats and the amoebic hepatitis of golden hamsters by administering the dissolved or suspended compounds per os once on five successive days. To evaluate the success of the treatment, the animals are destroyed and dissected seven days after the infection. The changes undergone by the intestine and the liver of the treated animals and, by comparison, of untreated infected animals, due to the infection, are macroscopically and microscopically checked.

To test the effect on trichomonades, the substance is subcutaneously administered, on five successive days, to mice which are intraperitoneally infested with *Trichomonas vaginalis*. Seven days after the infection, the animals are destroyed and dissected. Evaluation of the tests is carried out by detection of the trichomonades by microscopic observation of the abdominal cavity liquid, or of the small abscesses forming in the abdominal cavity, of treated mice, in comparison with untreated control animals.

The compounds according to the invention destroy the organisms causing *Entamoeba histolytica*, *Trichomonas vaginalis* and lambliae infections. Besides, they can be used in the oral treatment of the aforeside infections of human beings by administration in form of tablets, sugar-coated pills, capsules or as juice, optionally also in solution or suspension for parenteral injection. The therapeutical dosage for human beings amounts to approximately 2.5–30 mg./kg. per day for about 10 days. The dosage can be increased if the compatibility, which varies individually, is good.

Some experimental test results are assembled in the following table:

TABLE I

| Compound | Administration | Amoebic infection of rats (mg./kg.) | | | | | | | Amoebic infection of golden hamster (mg./kg.) | | | | | | | | Trichomonas vaginalis infection of mice (mg./kg.) | | | | | | | |
|---|---|---|---|---|---|---|---|---|---|---|---|---|---|---|---|---|---|---|---|---|---|---|---|---|
| | | 1,000 | 500 | 250 | 100 | 50 | 25 | 10 | 5 | 2.5 | 1,000 | 500 | 250 | 100 | 50 | 25 | 10 | 5 | 2.5 | 1,000 | 500 | 250 | 100 | 50 | 25 | 10 | 5 | 2.5 |
| 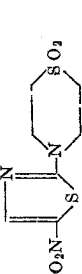 | Per os | | W | W | W | S | S | S/φ | | | | W | W | W | W/S | S | | | | | | | | | | | | |
| | Subcutaneously | | T | W | W | W/S | | | | | | W | W | W | W | W | | | | | | | | | | | | |
| 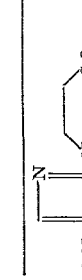 | Per os | | W | S | W | W/S | φ | φ | | | | W | W | W | W | W/S | W/S | | | | | W | W | W/S | W/S | φ | | |
| | Subcutaneously | | | | | | | | | | | W | W | W | W | W | | | | | | | | | | | | |
| 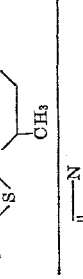 | Per os | | W | W | W | W | φ | | | | | W | W | W | W/S | W/S | W/S | S/φ | | | | W | W | W | W/S | S | S | |
| | Subcutaneously | | | | | | | | | | | | | | W/S | φ | | | | | | | | | | | | |
| Belgian Patent No. 682,989, Example 1 | Per os | | | W | W | W | φ | | | | | | W | W | W | W/S | | | | | | W | W | W | W/S | S | φ | |
| | Subcutaneously | | | | | | | | | | | | | | | | | | | | | | | | W | φ | | |

The symbols in the table denote, W=effect; S=weak effect; φ=no effect; T=dead.

EXAMPLE 1

(a) 59.7 g. (0.4 mole) 3-methyl-tetrahydro-1,4-thiazine-dioxide-(1,1) are dissolved in 400 cc. dioxan, mixed with 41.9 g. (0.2 mole) 2-bromo-5-nitrothiazole in 100 cc. dioxan and boiled under reflux for 7 hours. The hydrobromide of 3 - methyl - tetrahydro-1,4-thiazine-dioxide is slowly precipitated at boiling temperature and is dissolved, when the reaction is completed, by adding 500 ml. of water to the cooled reaction mixture. The precipitation then starting is accelerated by cooling with ice, the product is filtered off with suction, washed with cold ethanol and dried in a desiccator. Yield 39.0 g. (71% of theory) of 3-methyl-4-[5-nitrothiazolyl-(2)]-tetrahydro-1,4-thiazine-dioxide-(1,1):

After recrystallisation from plenty of ethanol, there are obtained orange-yellow needles of melting point 223 to 224° C.

*Analysis.*—Calcd. for $C_8H_{11}N_3O_4S_2$ (277.3) (percent): C, 34.65; H, 4.00; N, 15.15; O, 23.08. Found (percent): C, 34.74; H, 4.11; N, 15.13; O, 23.16.

(b) 3-methyl-tetrahydro-1,4-thiazine-dioxide- (1,1) is obtained by reacting 3-methyl-1,4-thioxan-dioxide-(1,1) with ammonia under pressure at 170° C.

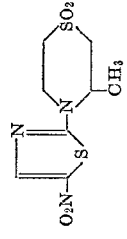

B.P. 148° C./1.0 mm. Hg; M.P. 40 to 42° C.
*Analysis.*—Calcd. for $C_5H_{11}NO_2S$ (149.3) (percent): C, 40.23; H, 7.43; N, 9.38; S, 21.48. Found (percent): C, 40.13; H, 7.50; N, 9.39; S, 21.95.

From the racemate obtained the laevo-rotatory form was separated with tartaric acid in water.

$[\alpha]_D^{21} = -15.2°$ (c.=10 in alcohol)

(c) 3-methyl-1,4-thioxan-dioxide-(1,1) is obtained by adding mercapto-ethanol on to propylene oxide to form 2-hydroxyethyl - 2′ - hydroxypropyl sulphide (B.P. 162° C./18 mm. Hg), oxidation of the sulphide with hydrogen peroxide to form the sulphone and alkaline cyclisation to form the 3-methyl-thioxan-dioxide.

EXAMPLE 2

38.9 g. (0.286 mole) tetrahydro-1,4-thiazine - dioxide are reacted with 30.0 g. (0.143 mole) 2-bromo-5-nitrothiazole in 300 cc. dioxan in analogy with Example 1(a). After working up by the addition of water, filtering off the precipitate with suction and drying, there are obtained 28 g. (75% of theory) of 4-[5-nitro-triazolyl-(2)]-tetrahydro-1,4-thiazine-dioxide-(1,1).

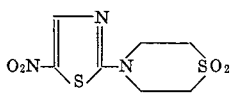

The melting point of the yellow compound after recrystallisation from ethanol: 262 to 263° C.

*Analysis.*—Calcd. for $C_7H_9N_3O_4S_2$ (263.3) (percent): C, 31.93; H, 3.44; N, 15.96; O, 24.31. Found (percent): C, 32.18; H, 3.53; N, 16.07; O, 24.67.

EXAMPLE 3

(a) 21.8 g. (0.1 mole) 4-[thiazolyl-(2)]-tetrahydro-1,4-thiazine-dioxide-(1,1) are introduced in the cold into 60 cc. (1.13 mole) of concentrated sulphuric acid and then nitrated with 4.6 cc. (0.1 mole) of concentrated nitric acid (d. 1.5) at −13 to 0° C. After further stirring for 1 to 2 hours, the mixture is poured on to 500 cc. of ice and neutralised with a 40% sodium hydroxide solution. The resultant yellow precipitate is filtered off with suction and dried; yield 22.5 g.=86% of theory of 4 - [5 - nitrothiazolyl - (2)] - tetrahydro - 1,4 - thiazine-dioxide-(1,1); melting point 262 to 263° C. (cf. Example 2).

(b) 4 - [thiazolyl-(2)]-tetrahydro-1,4-thiazine-dioxide-(1,1) is obtained by the dropwise addition of 43.5 g. (0.25 mole) chloroacetaldehyde semihydrate dissolved in 50 cc. acetone to a boiling solution of 97.2 g. (0.5 mole) tetrahydro-1,4-thiazine-1,1-dioxide-4-thiocarboxamide according to

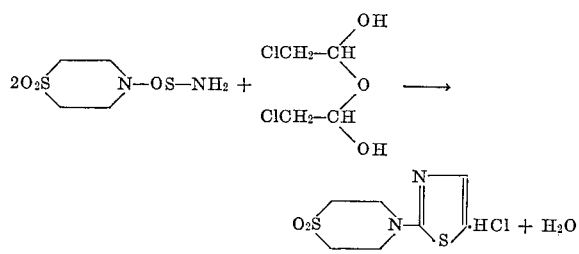

After boiling under reflux for 12 hours, 117 g. (92% of theory) of hydrochloride (M.P. 186° C.) are isolated from the cooled reaction solution; this is dissolved in water and neutralised with a 40% sodium hydroxide solution, in order to liberate the base, whereupon the water-insoluble 4 - [thiazolyl-(2)]-tetrahydro-1,4-thiazine-dioxide-(1,1) is precipitated. After drying and recrystallisation from isopropanol, the melting point is 138 to 139° C.

*Analysis.*—Calcd. for $C_7H_{10}N_2O_2S_2$ (218.3) (percent): C, 38.52; H, 4.61; N, 12.83; S, 29.38. Found (percent): C, 38.67; H, 4.62; N, 12.77; S, 29.05.

(c) Tetrahydro - 1,4-thiazino-1,1-dioxide-4-thiocarboxamide is obtained as a colorless precipitate by the simultaneous introduction of $H_2S$ and ammonia into a boiling suspension of 160 g. (1 mole) 4-cyano-tetrahydro-1,4-thiazine-dioxide-(1,1) in 800 cc. ethanol. Yield 138 g. (71% of theory) of thiocarboxamide; M.P. 227.5 to 229° C. (from dimethyl formamide/water).

*Analysis.*—Calcd. for $C_5H_{10}N_2O_2S_2$ (194.3) (percent): C, 30.91; H, 5.19; N, 14.42; S, 33.01. Found (percent): C, 31.14; H, 5.44; N, 14.54; S, 33.15.

(d) 4 - cyano-tetrahydro-1,4-thiazine-dioxide-(1,1) is obtained by reacting cyanogen chloride with tetrahydro-1,4-thiazine-dioxide according to

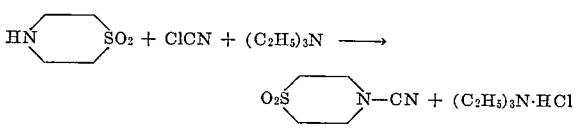

82 g. (1.33 mole) cyanogen chloride dissolved in 300 cc. methylene chloride are slowly added dropwise with cooling at a temperature of not more than 11° C., to a solution of 180 g. (1.33 mole) tetrahydro-1,4-thiazine-dioxide and 135 g. (1.33 mole) triethylamine in 1 litre of dry methylene chloride. The resultant precipitate is filtered off with suction and washed with 2 litres of water in portions, in order to remove the triethylamine hydrochloride. The residue after drying is 183 g. (86% of theory) of 4-cyano-tetrahydro1,4-thiazine-dioxide-(1,1); M.P. 247 to 249° C. [from dimethyl formamide/water (1:2.5)].

*Analysis.*—Calcd. for $C_5H_8N_2O_2S$ (160.2) (percent): C, 37.49; H, 5.04; N, 17.49; S, 20.02. Found (percent): C, 37.47; H, 5.09; N, 17.74; S, 19.85.

EXAMPLE 4

(a) 24.6 g. (0.1 mole) 3-ethyl-4-[thiazolyl-(2)]-tetrahydro-1,4-thiazine-dioxide-(1,1) are nitrated in the manner described in Example 3(a). After neutralising, filtering off with suction and drying over caustic soda, there are obtained 22.3 g. (77% of theory) of 3-ethyl-4-[5-nitro-thiazolyl-(2)]-tetrahydro-1,4-thiazinedioxide-(1,1):

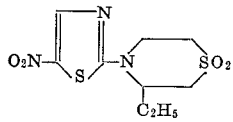

M.P. 192 to 193° C. after recrystallisation from 1.2 litres of isopropanol/water (9:1).

*Analysis.*—Calcd. for $C_9H_{13}N_3O_4S_2$ (291.4) (percent): C, 37.10; H, 4.50; N, 14.42; O, 21.97; S, 22.01. Found (percent): C, 37.36; H, 4.51; N, 14.41; O, 22.12; S, 21.80.

(b) 3 - ethyl-4-[thiazolyl-(2)]-tetrahydro-1,4-thiazine-dioxide-(1,1).—77.9 g. (0.35 mole) 3-ethyl-tetrahydro-1,4-thiazine-1,1-dioxide-4-thiocarboxamide are suspended in 250 cc. acetone, the suspension is heated to boiling point, and a solution of 30.5 g. (0.175 mole) chloroacetaldehyde semihydrate in 20 cc. acetone is added dropwise. The mixture is subsequently boiled under reflux for 90 minutes.

Working up as described in Example 3(b) yields 85.2 g. (86% theory) of a colorless crystalline hydrochloride (M.P. 208° C.) of the formula

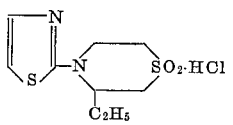

After dissolving the hydrochloride in water and neutralising with potash, the liberated base is extracted with methylene chloride which is distilled off after drying. The residue crystallises and is recrystallised from isopropanol; M.P. of 3-ethyl-4-[thiazolyl-(2)]-tetrahydro-1,4-thiazine-dioxide-(1,1): 90 to 91° C.

*Analysis.*—Calcd. for $C_9H_{14}N_2O_2S_2$ (246.4) (percent): C, 43.88; H, 5.73; N, 11.37; S, 26.03. Found (percent): C, 44.01; H, 5.66; N, 11.08; S, 25.25.

(c) 3 - ethyl-tetrahydro-1,4-thiazine-1,1-dioxide-4-thiocarboxamide.—39.8 g. (0.21 mole) 3-ethyl-4-cyano-tetrahydro-1,4-thiazine-dioxide-(1,1) are suspended in 350 cc. ethanol and reacted, as described in Example 3(c), with hydrogen sulphide to form the thiocarboxamide of the formula

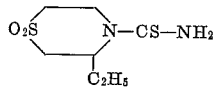

Yield 42.6 g. (91% of theory); M.P. 163 to 164° C.

*Analysis.*—Calcd. for $C_7H_{14}N_2O_2S_2$ (222.3) (percent): C, 37.82; H, 6.35; N, 12.60; S, 28.84. Found (percent): C, 37.04; H, 6.50; N, 12.61; S, 29.25.

(d) 3 - ethyl - 4-cyano-tetrahydro-1,4-thiazine-dioxide-(1,1) is obtained by reacting 163.2 g. (1 mole) 3-ethyl-tetrahydro-1,4-thiazine-dioxide-(1,1) with 30.8 g. (0.5 mole) cyanogen chloride in 1.5 litres methylene chloride. The precipitated hydrochloride of the starting compound is removed by filtering off with suction and the desired cyano compound of the formula

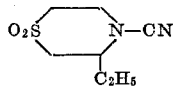

is obtained from the filtrate by concentration. Yield 75.1 g. (80% of theory); M.P. 126 to 126.5° C. (ethanol).

*Analysis.*—Calcd. for $C_7H_{12}N_2O_2S$ (188.3) (percent): C, 44.66; H, 6.43; N, 14.88; S, 17.03. Found (percent): C, 44.74; H, 6.64; N, 14.96; S, 16.66.

(e) 3-ethyl-tetrahydro-1,4-thiazine-dioxide-(1,1) is obtained by reacting 3-ethyl-1,4-thioxane-dioxide1(1,1) (M.P. 51 to 54° C.) with aqueous ammonia under pressure:

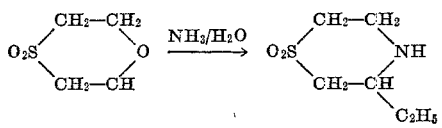

B.P. 176° C./0.3 mm. Hg.

(f) 3-ethyl-1,4-thioxane-dioxide-(1,1) is obtained by reacting mercapto-ethanol with 1,2-epoxy-butane to form 2-hydroxyethyl - 2' - hydroxybutyl - sulphide (B.P. 158° C./12 mm. Hg) and subsequent oxidation with hydrogen peroxide, followed by alkaline cyclisation according to the following reaction equation:

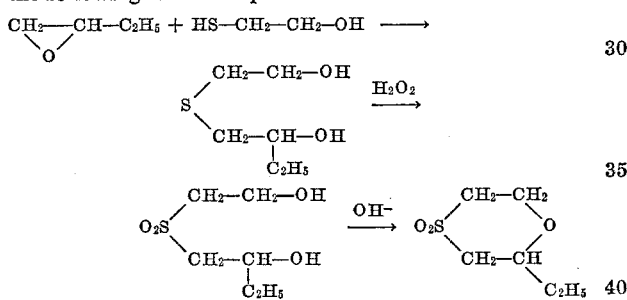

EXAMPLE 5

(a) 31.0 g. (0.14 mole) 3 - n - butoxymethyl-tetrahydro-1,4-thiazine-dioxide-(1,1) are reacted with 15.7 g. (0.075 mole) 2-bromo-5-nitro-thiazole by boiling under reflux in 270 cc. dioxan for 7 hours. The solvent is subsequently distilled off, the residue is taken up with 100 cc. of water and extracted with ether. After drying and evaporation of the ether, there remains 3-n-butoxy-4-[5-nitro-thiazolyl-(2)] - tetrahydro - 1,4 - thiazine - dioxide-(1,1) of the formula

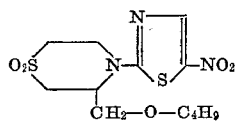

M.P. 122 to 125° C. (from methanol/water).

*Analysis.*—Calc. for $C_{12}H_{19}N_3O_5S_2$ (349.4) (percent): C, 41.24; H, 5.48; N, 12.02; S, 18.39. Found (percent): C, 41.98; H, 5.69; N, 11.98; S, 18.90.

(b) 3-n-butoxymethyl - tetrahydro - 1,4 - thiazine -dioxide-(1,1) used for the reaction with 2-bromo-5-nitrothiazole is obtained from 2-hydroxyethyl-2'-hydroxy-3'-butoxy-propyl-sulphone with aqueous ammonia at 170° C. in analogy with Examples 1(b) and 4(e).

*Analysis.*—Calc for.

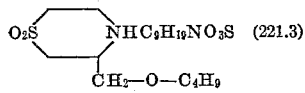

(percent): C, 48.84; H, 8.65; N, 6.33; S, 14.49. Found (percent): C, 48.81; H, 8.87; N, 6.36; S, 14.85.

(c) 2-hydroxyethyl-2'-hydroxy - 3' - butoxy - propyl-sulphone is formed by oxidation of the corresponding 2-hydroxyethyl-2' - butoxymethyl - 2' - hydroxyethyl - sulphide with hydrogen peroxide (cf. reaction equation in Example 4(f); B.P. 150 to 155° C./0.05 mm. Hg.

(d) 2-hydroxyethyl-2'-hydroxy - 3' - butoxy - propyl-sulphide is prepared by alkali-catalysed addition of mercapto-ethanol on to glycide-butyl ether in analogy with the reaction equation of Example 4(f); B.P. 140 to 145° C./0.15 mm. Hg; B.P. 132° C./0.06 mm. Hg.

EXAMPLE 6

(a) A solution of 33.5 g. (0.15 mole) 3-(2-methoxy ethoxy)-methyl-tetrahydro-1,4-thiazine-dioxide-(1,1) and 15.7 g. (0.075 mole) 2-bromo-5-nitrothiazole in 300 cc. dioxan is heated in an autoclave at 140° C. for 5 hours. The residue obtained after distilling off the solvent is treated with ether for purification from oily impurities and subsequently with water to remove the hydrobromide of the starting base. As residue there remains 3-(2-methoxy-ethoxy)-methyl-4-[5 - nitro - thiazolyl - (2)]-tetrahydro-1,4-thiazine-dioxide-(1,1) of the formula

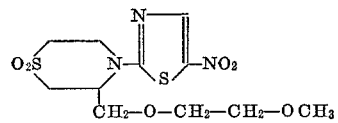

M.P. 125 to 127° C. (yellow crystals from isopropanol).

*Analysis.*—Calc. for $C_{11}H_{17}N_3O_6S_2$ (351.4) (percent): C, 37.58; H, 4.89; N, 11.96; O, 27.32; S, 18.25. Found (percent): C, 38.21; H, 5.10; N, 11.92; O, 28.17; S, 17.14.

(b) 3-(2-methoxy - ethoxy) - methyl-tetrahydro - 1,4-thiazine-dioxide-(1,1) was obtained by reacting 2-hydroxyethyl-2'-hydroxy-3'-(2-methoxy - ethoxy) - propylsulphone with aqueous ammonia under pressure at 170° C.

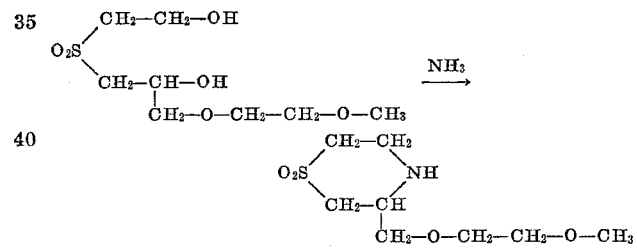

B.P. 165 to 172° C./0.06 mm Hg.

*Analysis.*—Calc. for $C_8H_{17}NO_4S$ (223.3) (percent): C, 43.03; H, 7.68; N, 6.27; S, 14.36. Found (percent): C, 43.17; H, 7.85; N, 6.29; S, 14.10.

(c)(d) The 2-hydroxyethyl-2'-hydroxy-3'-(2 - methoxy ethoxy)-propyl-sulphone used for this cyclisation was not isolated, but the oxidation product of the sulphide obtained by the addition of mercapto-ethanol on to 1,2-epoxy-3-(2'-methoxy-ethoxy)-propane (B.P. 80 to 81° C./14 mm. Hg) was used for the reaction:

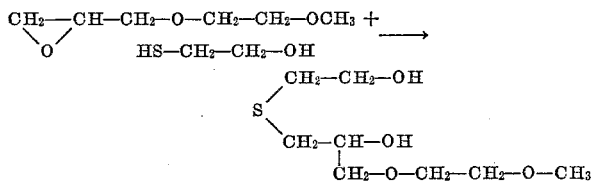

EXAMPLE 7

(a) When 17.0 g. (0.1 mole) 4-[thiazolyl-(2)]-tetrahydro-1,4-oxazine are nitrated in the manner described in Example 3, then there are obtained, after the usual working up, 19.5 g. (91% of theory) of bright yellow 4-[5-nitro-thiazolyl-(2)]-tetrahydro-1,4 - oxazine of M.P. 148 to 149° C.:

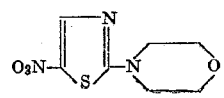

*Analysis.*—Calc. for $C_7H_9N_3O_3S$ (215.2) (percent): C, 39.06; H, 4.22; N, 19.52; S, 14.90. Found (percent): C, 39.07; H, 4.62; N, 19.59; S, 14.75.

(b) The 4-[thiazolyl-(2)]-morpholine used for the nitration is obtained from 146 g. (1 mole) 4-morpholine-thiocarboxamide and 87 g. (0.5 mole) chloroacetaldehyde semihydrate in boiling acetone (350 cc.):

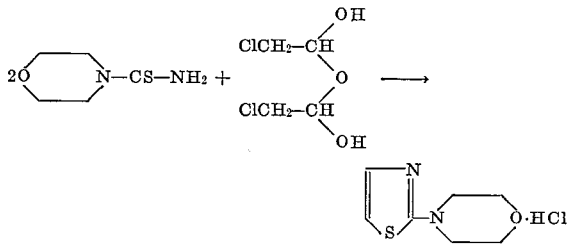

From the hydrochloride which is insoluble in acetone and crystallises with 2 molecules of water (M.P. 181 to 184° C.), the base can be liberated in an aqueous solution in the usual manner and extracted with ether. The yield amounts to 128 g. (81% of theory) of 4-[thiazolyl-(2)]-morpholine; B.P. 137 to 138° C./12 mm. Hg; M.P. 31 to 32.5° C.

*Analysis.*—Calc. for $C_7H_{10}N_2OS$ (170.2) (percent): C, 49.39; H, 5.92; N, 16.45; O, 9.39; S, 18.87. Found (percent): C, 49.64; H, 6.08; N, 16.36; O, 9.43; S, 18.63.

EXAMPLE 8

2-morpholino-5-nitrothiazole 42 g. (0.2 mole) 2-bromo-5-nitrothiazole are introduced at 0° C. into a solution of 43.5 g. (0.5 mole) morpholine in 500 cc. dioxan, and the mixture is subsequently heated at 60° C. for 3 hours. After cooling, the mixture is diluted with 300 cc. of water, the product is filtered off with suction and recrystallised from alcohol. Yield 29.0 g. of lemon-yellow crystals (69% of theory) and melting point 146° C.

*Analysis.*—Calc. for $O_7H_9N_3O_3S$ (215.2) (percent): C, 39.06; H, 4.22; N, 19.52; S, 14.90. Found (percent): C, 39.17; H, 4.33; N, 19.68; S, 15.25.

EXAMPLE 9

(a) 23.2 g. (0.1 mole) 3-methyl-4-[thiazolyl-(2)]-tetrahydro-1,4-thiazine-dioxide-(1,1) are dissolved in 130 cc. of concentrated sulphuric acid and nitrated at not more than 5° C. with 4.6 cc. of 95% nitric acid. After 2½ hours, mixture is poured onto ice and the resultant precipitate is filtered off without previous neutralisation of the solution, washed and dried. There are obtained 23.4 g. (84% of theory) of 3-methyl-4-[5-nitro-thiazolyl-(2)]-tetrahydro-1,4-thiazine-dioxide-(1,1); M.P. 222 to 224° C. (cf. Example 1(a)).

With a mixture consisting of 426.5 g. (1.84 mole) 3-methyl - 4 - [thiazolyl-(2)]-tetrahydro-1,4-thiazine-dioxide-(1,1), 2.55 litres of 96% by weight sulphuric acid and 121 g. (1.84 mole) of 95% by weight nitric acid, the yield can be increased to 96% of theory while maintaining the same degree of purity of the final product, when the reaction solution is heated, after adding $HNO_3$ at −6 to +23° C. within 2½ hours, at 50° C. for 1 hour.

(b) 3-methyl - 4 - [thiazolyl-(2)]-tetrahydro-1,4-thiazine-dioxide-(1,1) is obtained by reacting 41.7 g. (0.2 mole) 3-methyl-tetrahydro-1,4-thiazine-1,1-dioxide-4-thiocarboxamide with 17.5 g. (0.1 mole) chloro-acetaldehyde semihydrate, in the presence of 300 cc. acetone as reaction medium, at boiling temperature, whereby the hydrochloride of the cyclisation product is initially formed (M.P. 195 to 200° C.), from which the base is liberated with potash in an aqueous solution and extracted with methylene chloride. Yield 40.9 g. (88% of theory) of the compound

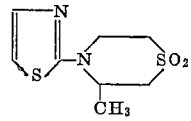

M.P. 115 to 117° C. (from isopropanol).

*Analysis.*—Calc. for $C_8H_{12}N_2O_2S_2$ (232.3) (percent): N, 12.06. Found (percent): N, 12.00.

(c) 3-methyl - tetrahydro - 1,4 - thiazine-1,1-dioxide-4-thiocarboxamide

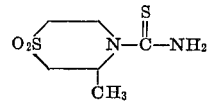

can be obtained by passing hydrogen sulphide and ammonia into a boiling solution of 3-methyl-4-cyano-tetrahydro-1,4-thiazine-dioxide-(1,1) in methanol; M.P. 155 to 157° C.

*Analysis.*—Calc. for $C_6H_{12}N_2O_2S_2$ (208.3) (percent): C, 34.6; H, 5.8; S, 30.8. Found (percent): C, 35.0; H, 5.7; S, 29.9.

(d) 3-methyl-4-cyano-tetrahydro-1,4-thiazine - dioxide-(1,1)

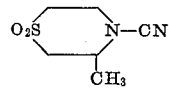

M.P. 159 to 163° C. (from methanol), can be obtained with a yield of 98.5% by reacting 2 moles of the 3-methyl-tetrahydro-thiazine-dioxide-(1,1) obtainable according to Example 1(b), with 1 mole cyanogen chloride in methylene chloride as solvent in which the hydrochloride of the starting base formed as byproduct is precipitated and can be removed by filtration.

*Analysis.*—Calc. for $C_6H_{10}N_2O_2S$ (174.2) (percent): C, 41.4; H, 5.8; O, 18.4; S, 18.5. Found (percent): C, 41.7; H, 5.8; O, 18.9; S, 18.5.

EXAMPLE 10

(a) The 4-[5-nitro - thiazolyl-(2)]-tetrahydro-1,4-thiazine-dioxide-(1,1) is also obtained in a good yield, when 104 g. (0.5 mole) 2-methylsulphonyl-5-nitrothiazole are reacted with 67.6 g. (0.5 mole) tetrahydro-1,4-thiazine-dioxide-(1,1) in 500 cc. of boiling dioxan.

(b) 2-methylsulphonyl - 5 - nitrothiazole is obtained by introducing 105 g. (0.5 mole) 2-bromo-5-nitrothiazole in the solid form into a solution of 170 g. (0.55 mole) of 33% sodium methylsulphinate (remainder sodium sulphate and sodium chloride) in 1 litre of water and heating the mixture at 70° C. for ½ hour. The sulphone is precipitated upon cooling in the form of colourless crystals scales. Yield 79.5 g. (77% of theory) of the compound

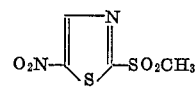

M.P. 119 to 122° C. (from isopropanol).

*Analysis.*—Calc. for $C_4H_4N_2O_4S_2$ (molecular weight 208.2) (percent): C, 23.1; H, 1.9; N, 13.5. Found (percent): C, 23.2; H, 2.2; N, 14.0.

EXAMPLE 11

The 3-methyl - 4 - [5 - nitrothiazolyl-(2)]-tetrahydro-1,4-thiazine-dioxide-(1,1) which can be prepared according to Example 1(a) is also obtained, when 29.9 g. (0.2 mole) 3-methyl-tetrahydro-1,4-thiazine-dioxide-(1,1), 41.9 g. (0.2 mole) 2-bromo-5-nitrothiazole, 12.4 g. (0.1 mole) sodium carbonate and 1 g. 3-benzyl-4-hydroxy-biphenyl-polyglycol ether are introduced into 750 cc. of water, the mixture is heated at 50 to 60° C. for 5 hours, and the final product which crystallises upon cooling is isolated in the usual manner.

What is claimed is:
1. A 5-nitrothiazole derivative of the formula:

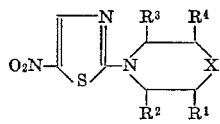

wherein X is oxygen or $SO_2$ and $R^1$, $R^3$ and $R^4$ are hydrogen and $R^2$ is hydrogen, lower alkyl of 1 to 4 carbon atoms or lower alkyl of 1 to 4 carbon atoms substituted by $-O-(CH_2)_2-O$-alkyl wherein alkyl is of 1–3 carbon atoms.

2. Compound according to claim 1 which is 3-methyl-4-[5-nitrothiazolyl-(2)]-tetrahydro-1,4 - thiazine - dioxide-(1,1).

3. Compound according to claim 1 which is 4-[5-nitrothiazolyl-(2)] - tetrahydro - 1,4 - thiazine - dioxide - (1,1).

4. Compound according to claim 1 which is 4-[5-nitrothiazolyl-(2)]-tetrahydro - 1,4 - thiazine- dioxide-(1,1).

5. Compound according to claim 1 which is 3-ethyl-4-[5-nitrothiazolyl-(2)]-tetrahydro - 1,4 - thiazine-dioxide-(1,1).

6. Compound according to claim 1 which is 3-n-butoxy-4-[5-nitrothiazolyl-(2)]-tetrahydro - 1,4 - thiazine-dioxide-(1,1).

7. Compound according to claim 1 which is 3-(2-methoxyethoxy)-methyl-4-[5-nitrothiazolyl-(2)] - tetrahydro-1,4-thiazine-dioxide-(1,1).

8. Compound according to claim 1 which is 4-[5-nitrothiazolyl-(2)]-tetrahydro-1,4-oxazine.

9. Compound according to claim 1 which is 2-morpholino-5-nitrothiazole.

10. Compound according to claim 1 which is 3-methyl-4-[5-nitrothiazolyl-(2)]-tetrahydro - 1,4 - thiazine-dioxide-(1,1).

11. A process for the production of a 5-nitrothiazole derivative of the formula:

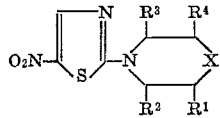

wherein X is oxygen or $SO_2$ and $R^1$, $R^3$ and $R^4$ are hydrogen and $R^2$ is hydrogen, lower alkyl of 1 to 4 carbon atoms or lower alkyl of 1 to 4 carbon atoms substituted by $-O-(CH_2)_2-O$-alkyl wherein alkyl is of 1 to 3 carbon atoms which comprises reacting a compound of the formula:

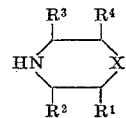

wherein X and $R^1$ to $R^4$ are as defined above with a 2-substituted 5-nitrothiazole of the formula:

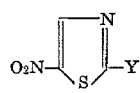

wherein Y is $SO_2-CH_3$ and recovering the 5-nitrothiazole derivative produced.

References Cited
UNITED STATES PATENTS 2,639,285    5/1953    Sondern et al. _____ 260—306.8
3,201,409    8/1965    Spivack et al. _____ 260—306.8

OTHER REFERENCES

Schmidt et al.: Angew, Chemie, vol. 78, pp. 850–5 (1966), QD 1.Z5.

Bonzom et al.: Bull. Soc. Chim. France, pp. 2582–8 (1963), QD 1.S4.

HENRY R. JILES, Primary Examiner

J. M. FORD, Assistant Examiner

U.S. Cl. X.R.

260—247.1, 247, 306.8, 465.5, 609, 327, 302, 615, 999

Disclaimer 3,505,320.—*Erich Dabritz* and *Heinz Herlinger*, Leverkusen, and *Marianne Bock*, Wuppertal-Elberfeld, Germany. 5-NITROTHIAZOLE DERIVATIVES AND THEIR PRODUCTION. Patent dated Apr. 7, 1970. Disclaimer filed Nov. 2, 1970, by the assignee, *Farbenfabriken Bayer A.G.*

Hereby enters this disclaimer to claims 4, 9 and 10 of said patent.
[*Official Gazette March 2, 1971.*]